Dec. 27, 1938.  J. L. FERGUSON  2,141,525
CARTON PACKER AND SEALER
Filed Jan. 20, 1936  10 Sheets-Sheet 2

Dec. 27, 1938.   J. L. FERGUSON   2,141,525
CARTON PACKER AND SEALER
Filed Jan. 20, 1936   10 Sheets-Sheet 3

Inventor!
John L. Ferguson
By: Jones, Addington, Ames & Seibold
Attys.

Dec. 27, 1938.    J. L. FERGUSON    2,141,525
CARTON PACKER AND SEALER
Filed Jan. 20, 1936    10 Sheets-Sheet 7
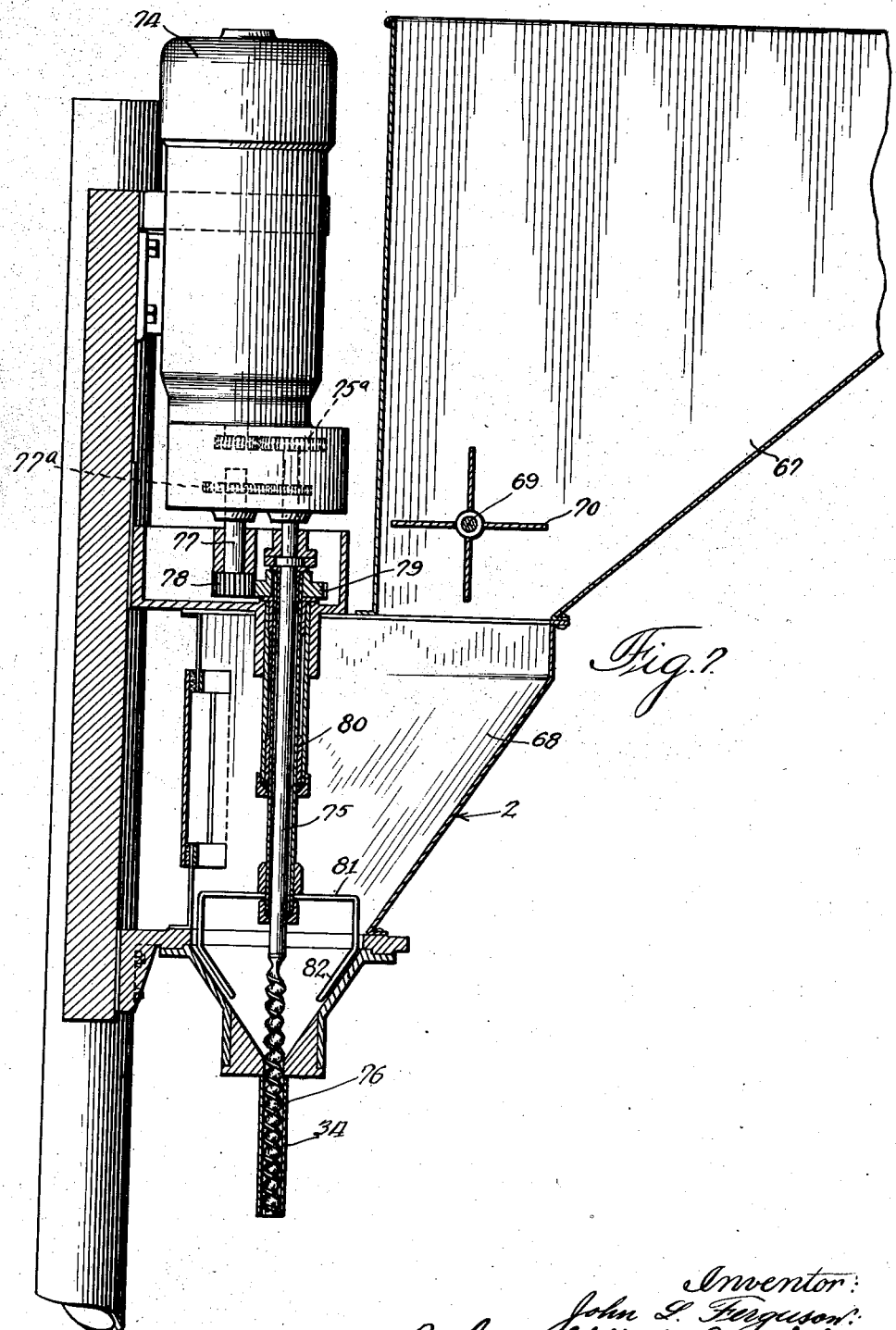

Dec. 27, 1938.                 J. L. FERGUSON                 2,141,525
                          CARTON PACKER AND SEALER
                          Filed Jan. 20, 1936        10 Sheets-Sheet 8

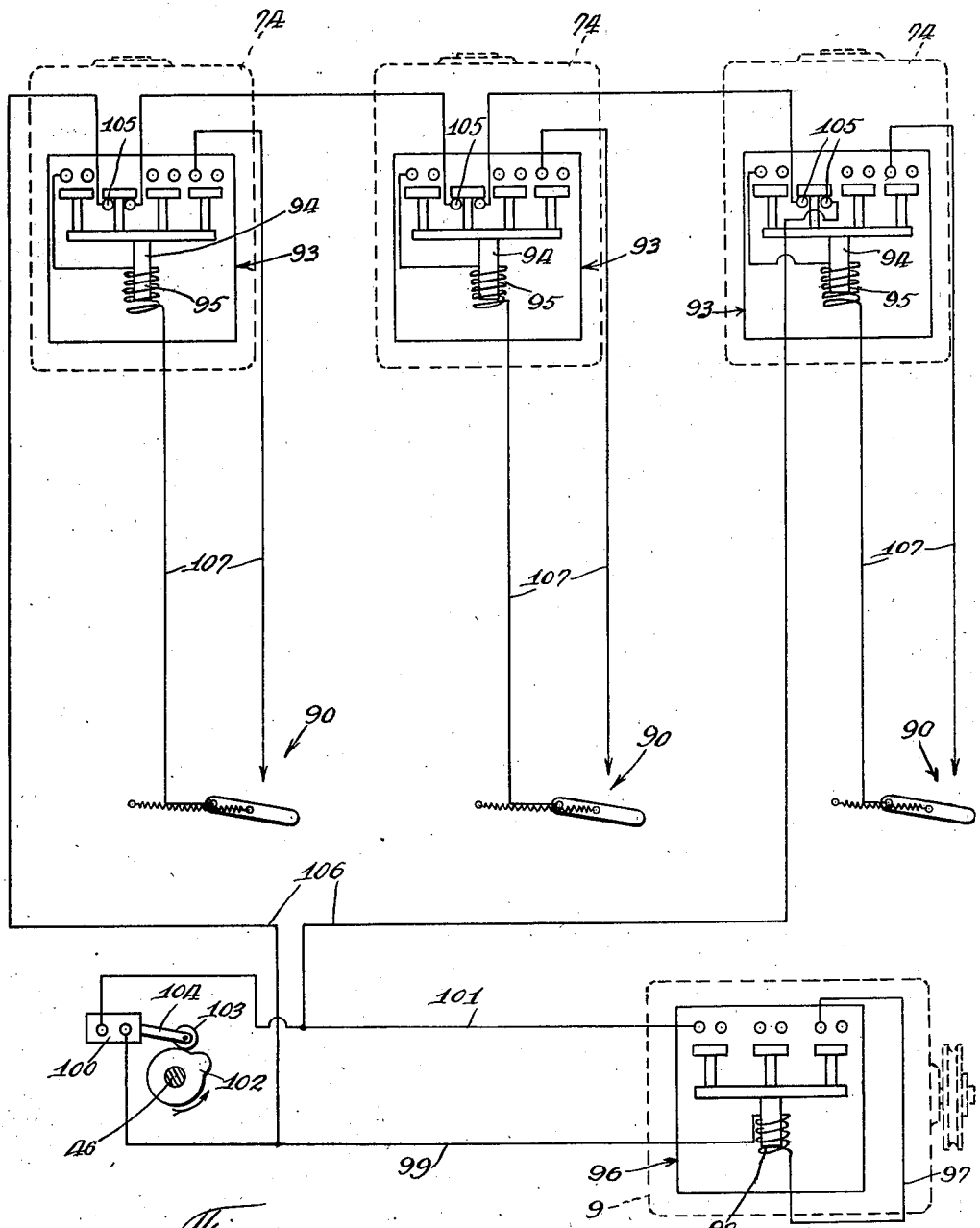

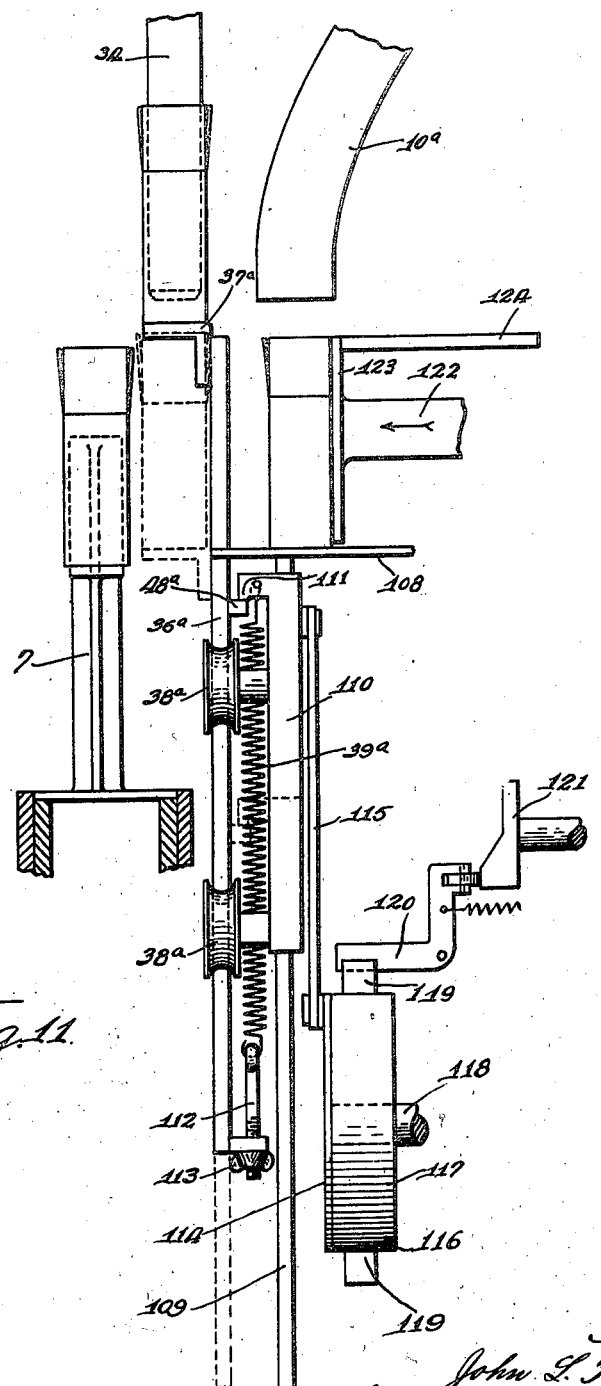

Patented Dec. 27, 1938

2,141,525

UNITED STATES PATENT OFFICE 2,141,525

CARTON PACKER AND SEALER

John L. Ferguson, Joliet, Ill., assignor to J. L. Ferguson Company, Joliet, Ill., a corporation of Illinois Application January 20, 1936, Serial No. 59,851

23 Claims. (Cl. 93—6)

This invention relates to carton packers and sealers, and more particularly to that type of packers and sealers in which squared out cartons are first sealed at one end and are then inverted and filled and the opposite end sealed. The filled cartons are then discharged from the machine in the usual manner, preferably between conveyor belts or similar devices which retain the freshly sealed flaps in closed position until the adhesive is sufficiently dry to hold them in place.

The present invention contemplates a combined packer and sealer in which the cartons after having one end sealed are positioned under filling devices from which the material is supplied to the cartons and simultaneously packed therein whereby each carton will contain a specified amount of material, which material is snugly packed in the cartons during the filling operation. The cartons are then automatically delivered to a sealing mechanism where the open end is sealed and the cartons delivered from the machine in the usual manner.

It is an object of the present invention to provide a combined packer and sealer which is particularly adapted for quantity production of filled and sealed cartons and in which the sealing and packing mechanisms cooperate for continuous high speed quantity production of filled cartons.

A further object is the provision of suitable means to automatically stop the operation of the entire filling, packing, and sealing mechanism if for any reason a carton is not properly filled and packed.

It is also an object to provide suitable means whereby the filling mechanism is prevented from functioning if a carton is not properly positioned thereunder.

It is also an object to provide a suitable and effective mechanism whereby a plurality of cartons sealed at one end in the sealing mechanism may be delivered to a position to be filled by the filling and packing mechanism and thereafter returned to the sealing mechanism for final sealing of the cartons, and all this is accomplished while maintaining the full normal speed of the sealing device.

Further objects will be apparent from the specification and the appended claims.

In the drawings:

Fig. 7 is a vertical sectional view through one of the fillers and packers and is taken on a line substantially corresponding to line 7—7 of Fig. 5.

Fig. 10 is a diagrammatic view of the automatic electrical control system.

Fig. 11 is a somewhat diagrammatic view of a modified form of the filler mechanism with a portion of the sealer conveyor adjacent thereto shown in section.

Figure 1:
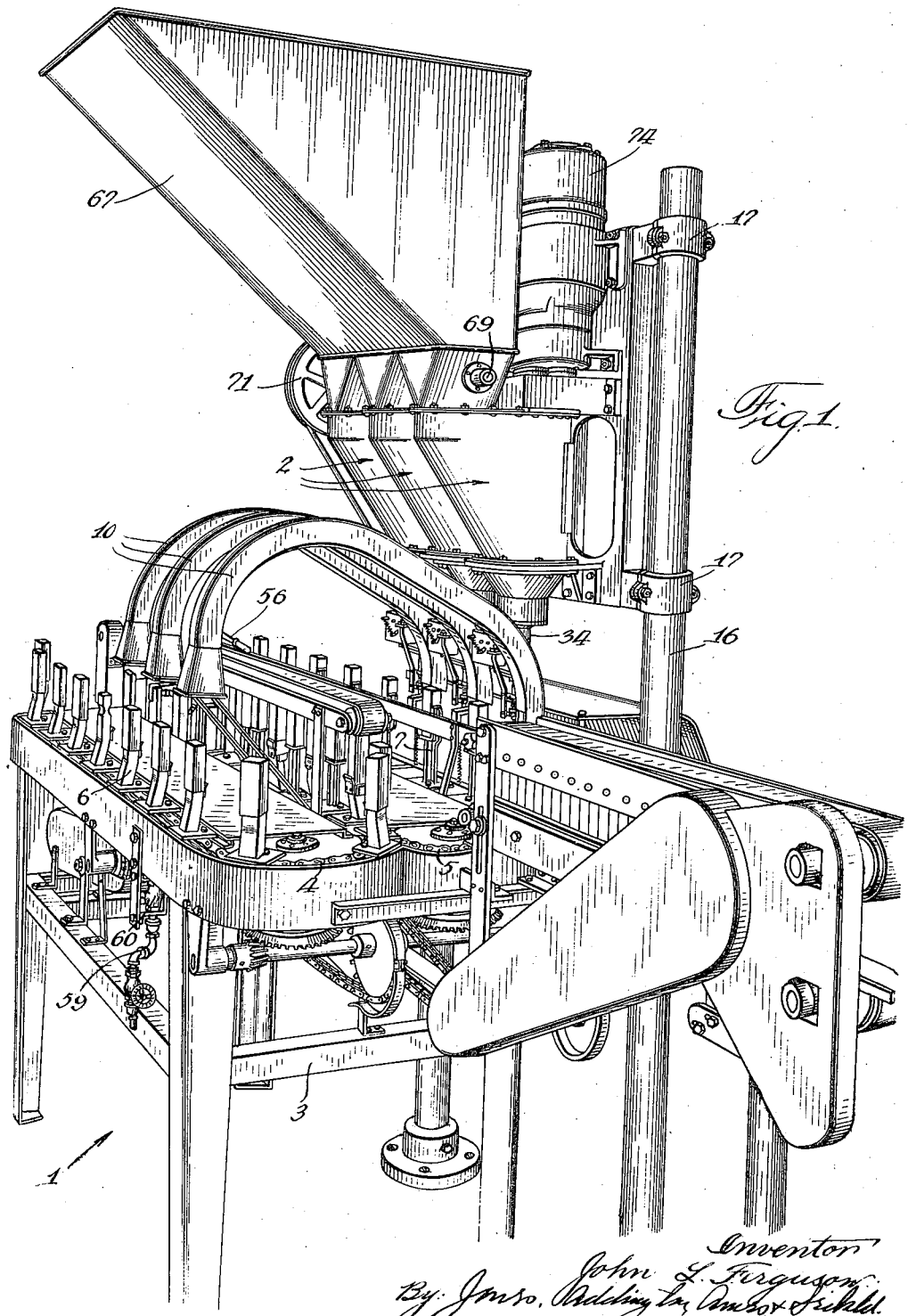
Figure 1 is a perspective view of one embodiment of the invention and illustrates a complete so-called double sealer and cooperating mechanism associated therewith for filling and packing the cartons with suitable material.

The embodiment illustrated in the drawings comprises a carton double sealer having a plurality of carton fillers and packers associated therewith, the fillers being controlled in synchronism with the sealer by empty cartons automatically transferred from the sealer to the filling tables. The sealer may be any of the usual types of double sealers, preferably such as disclosed and claimed in my Patent No. 1,423,094, issued July 18, 1922, in which co-operating horizontal conveyors are provided with stands and chairs, respectively, for supporting the cartons. The conveyors are preferably continuously movable, and squared out cartons may be placed on the stands either automatically or by hand and sealed at one end. They are then transferred to a separate filling machine where they are filled and returned to the sealer by a suitable conveyor.

In the present invention the cartons are transferred from the sealing conveyor to a filling conveyor and then returned to the sealing conveyor to be sealed. After the squared out cartons are placed on the stands and sealed at one end, they are carried by the conveyor under the open ends of suitable carton chutes, and the empty cartons will be blown therein by compressed air jets and will pass through the chutes which are shaped to invert the cartons and deliver them with the open end up on a suitable filling conveyor, which latter is positioned parallel with and adjacent the final sealer conveyor. In the present instance three chutes are provided; therefore, three empty cartons are simultaneously inverted and delivered to the filling conveyor. The filling conveyor moves intermittently, and after the empty cartons are delivered thereto, they are all simultaneously moved under suitable filling spouts and onto vertically movable tables which automatically raise and telescope the cartons over the filling spouts where they are automatically filled and pushed downwardly as the material is packed therein.

After the cartons are filled, the individual filling motors are automatically stopped, and the next step of the filling conveyor moves the cartons from under the filling spouts while succeeding empty cartons are positioned thereunder. Suitable plungers are then operated to push the filled cartons from the filling conveyor onto the empty chairs of the final sealing conveyor. The sealing conveyor then moves the cartons through the sealing mechanism by which they are sealed and they are later discharged into a suitable discharge conveyor.

In the sealer mechanism one endless conveyor is provided with a series of stands for the squared out cartons and the other conveyor is provided with a corresponding series of chairs for the filled cartons. Both series of carton supporting members traverse the same path during a portion of their travel, and the members are disposed on the conveyors so that the members of each series will alternate and be interspaced with those of the other series during the time when both series are traversing the same path. During the time both series of members are traversing the same path, the open ends of the carton are folded down and glued in place.

In the present embodiment three filling mechanisms are used in co-operation with a single hopper although any suitable number may be used, and a single filling conveyor travels under the three filling spouts and closely adjacent and parallel with the final sealing conveyor. Therefore, three carton chutes and three air jets are provided for simultaneously transferring and inverting the empty cartons from three of the stands of the sealer conveyor to the filler conveyor at points adjacent the filling spouts.

The cartons, after being delivered to the filling conveyor, are moved two steps thereby; that is, from the received position they are moved one step to the filling position under the filling spout, then one step more to a position to be pushed from the filling conveyor to one of the chairs of the sealing conveyor. Empty cartons are delivered with each step of the filling conveyor so that there are always three cartons on the filling conveyor adjacent each filling spout—one just received, one being filled, and one being pushed onto a chair of the sealer.

In order that three empty chairs on the final sealing conveyor may always be in alignment with the filled cartons when they are delivered thereto from the filling conveyor, the intermittently movable filling conveyor is synchronized with the movement of the chairs on the final sealing conveyor so that each carton on the filling conveyor moves one step—that is, from under the filling spout to a position to be pushed onto the sealing conveyor—while the sealing conveyor moves sufficiently to bring three empty chairs into alignment with the three filled cartons. In other words, each step of the filling conveyor is performed in substantially the length of time required to move three filled chairs away from loading position and three succeeding empty chairs into position to receive filled cartons. Therefore, when three cartons are filled, there will always be three empty chairs on the sealing conveyor aligned therewith to receive the filled cartons as they are pushed from the filling conveyor.

Referring more particularly to the drawings, the embodiment illustrated comprises a double sealer 1 similar to that disclosed in the previously mentioned patent and having a plurality of carton fillers and packers 2 associated therewith for filling and packing cartons after the first sealing operation and before the final sealing.

Figure 2:
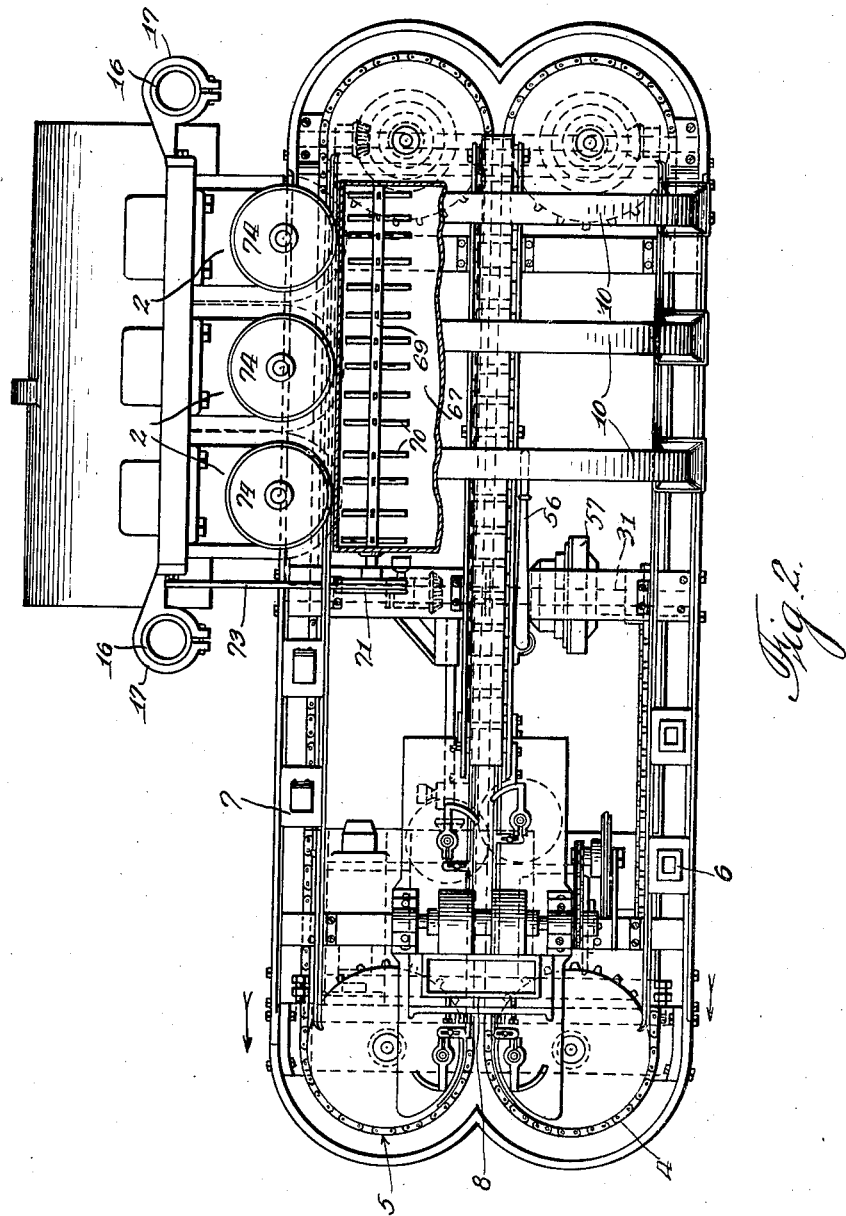
Fig. 2 is a top view of the embodiment illustrated in Fig. 1 with a portion of the material-container or hopper of the filling mechanism broken away for purposes of illustration.

The double sealer comprises a frame 3 on which is supported a pair of cooperating horizontal conveyors 4 and 5. The conveyor 4 is provided with the usual spaced stands 6 for supporting the squared out cartons which may be applied thereto by an operator or by any suitable automatic means. The conveyor 5 is provided with chairs 7 to receive the cartons after they have been filled. Both of these conveyors travel adjacent a centrally located flap folding and sealing mechanism which is indicated generally by the reference character 8, and both conveyors pass adjacent this sealing mechanism in a manner whereby the stands 6 and the chairs 7 are aligned and travel alternately therethrough. The conveyors travel in the direction of the arrows in Fig. 2.

Figure 3:
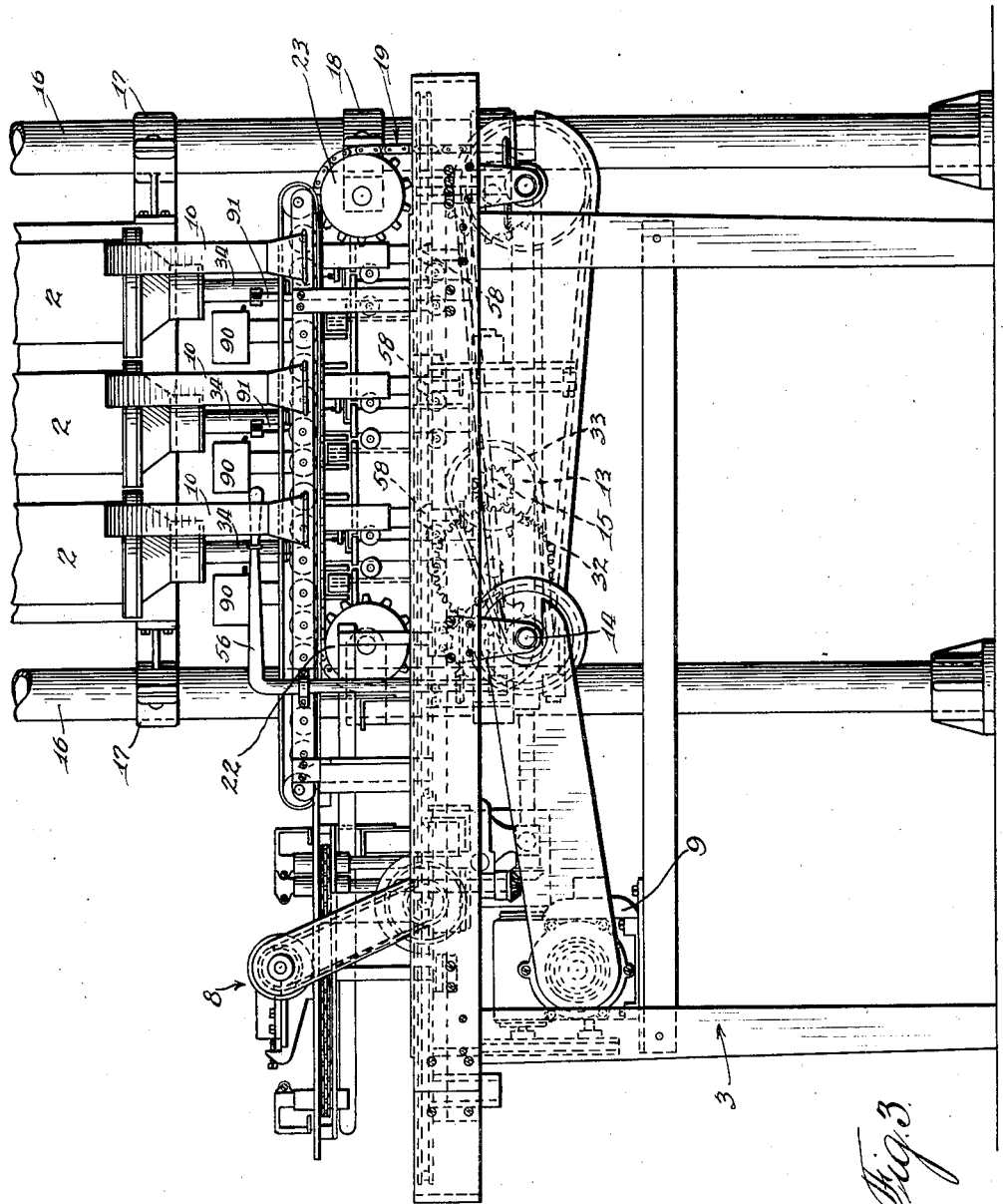
Fig. 3 is a front elevation of the embodiment illustrated in Figs. 1 and 2 with the carton stools of the sealer conveyors removed, as well as the discharge conveyor, and with the upper portion of the filling and packing mechanism broken away.

The conveyor chains are suitably supported on sprockets secured to vertical shafts adjacent the ends of the machine, and a suitable transmission mechanism is provided whereby the conveyors may be driven from a motor 9 (Fig. 3). This sealing mechanism may be similar to and operated in the same manner as that disclosed in the above mentioned patent, and it is therefore believed unnecessary to further describe the double sealer in detail.

In the above mentioned patent a single carton chute is provided, and a compressed air jet blows the empty cartons from the stands as they move under the end of the chute and the cartons are carried through the chute to a remote position to be filled. The filled cartons are then returned to the chairs of the sealer by means of an auxiliary conveyor. In the present embodiment, however, a plurality of carton chutes 10 are provided. In the present instance, three are found to be preferable, and these chutes extend to points adjacent the outer span of the final sealing conveyor and deliver the empty cartons to a filling conveyor, the mechanism of which will now be described.

Figure 4:
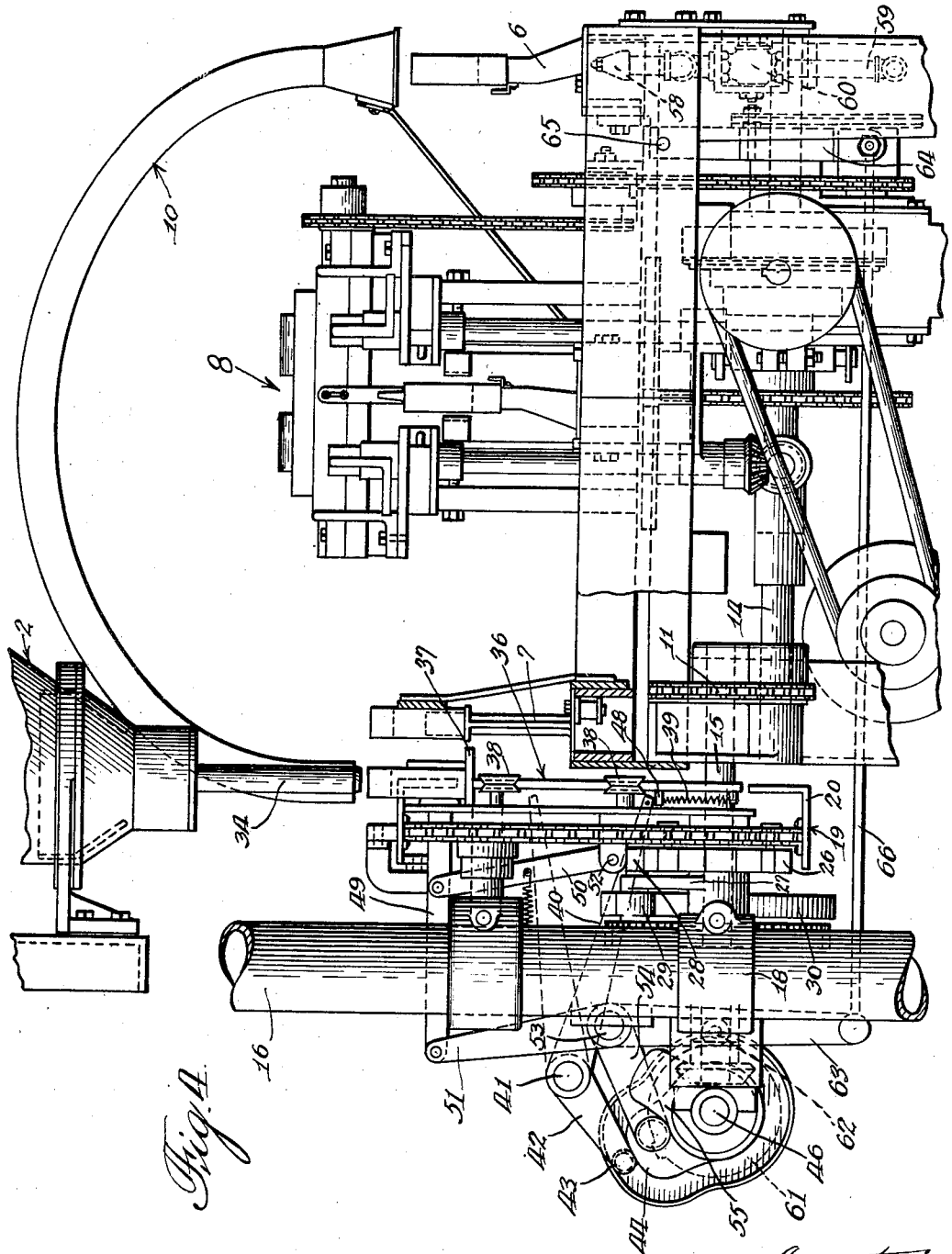
Fig. 4 is a lefthand end view of the embodiment illustrated in Figs. 1, 2 and 3, with a portion of the carton sealer frame and conveyor broken away and the motor starting switch and tripping mechanism associated with the carton supporting plunger omitted for purposes of illustration.
Figure 5:
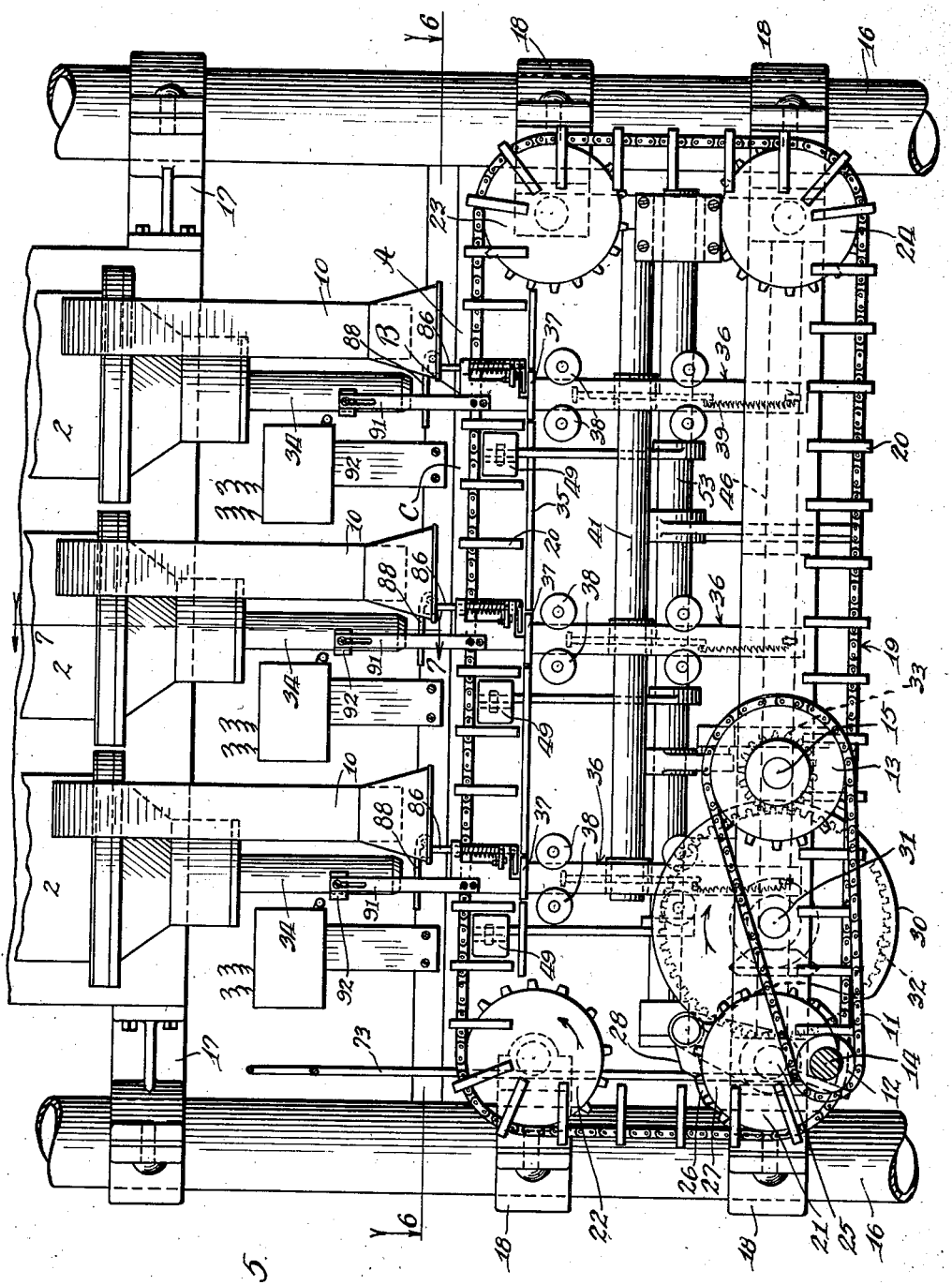
Fig. 5 is a front elevation of the carton filler mechanism with the transmission shaft from the sealer mechanism for driving the packing control mechanism shown in section. This view further illustrates the packing conveyor on which the empty cartons, after being delivered from the sealer, are positioned under the filling spouts.
Figure 6:
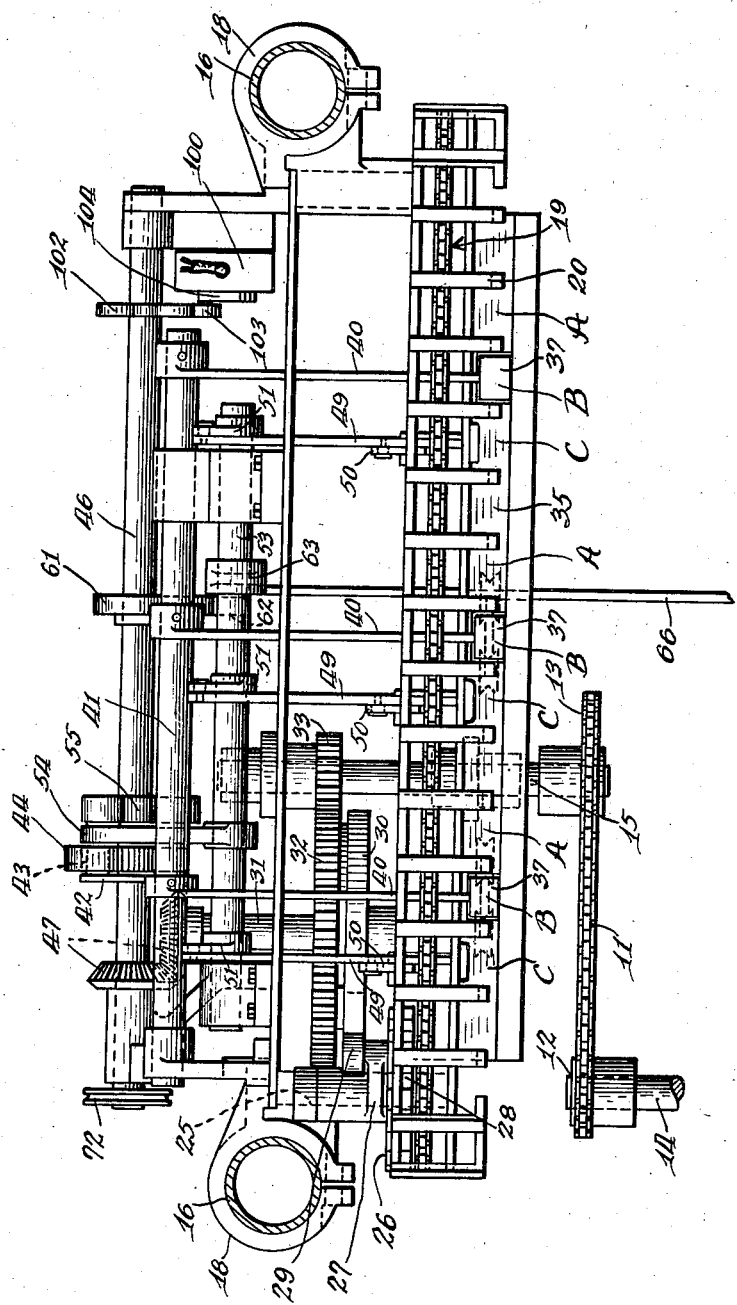
Fig. 6 is a top view of the filler controller mechanism illustrated in Fig. 5 and is taken on a line substantially corresponding to line 6—6 of Fig. 5.

As illustrated particularly in Figs. 4 and 6, the filling mechanism is located adjacent the final sealing conveyor and may be driven by means of a chain 11 and suitable sprockets 12 and 13. The sprocket 12 is secured to the extended end of one of the transmission shafts 14 of the double sealer and is continuously driven thereby, and the sprocket 13 is secured to a short transverse shaft 15 forming part of the filler control transmission as illustrated in Figs. 4, 5, and 6. The filler control mechanism may, of course, be driven from any suitable source of power on the sealer mechanism or in any suitable manner whereby it is synchronized therewith.

The fillers and the control mechanism therefor are preferably vertically adjustable on suitable posts 16 adjacent the sealer, the fillers 2 being supported on a suitable frame and adjustable on the posts by means of brackets 17. The control mechanism is adjustably mounted on the same posts by means of brackets 18 secured to a suitable frame on which the control mechanism, including a filling conveyor 19, is mounted. By this means the fillers may be adjusted to accommodate different size cartons and the filling control mechanism may be brought into the desired alignment with the sealer.

The filling conveyor 19 preferably comprises a chain having suitable flights 20 thereon for moving the cartons. The conveyor chain is supported on sprockets 21, 22, 23, and 24 (Fig. 5). The sprockets 22, 23, and 24 are idlers; the sprocket 21 is rotatably mounted on a stub shaft 25, and a ratchet wheel 26 (Figs. 4, 5, and 6) is secured to the sprocket for operating the filling conveyor chain 19 step by step. A pawl arm 27 is oscillatably mounted on the stub shaft 25 and is provided with a pawl 28 for engaging the ratchet wheel 26. The pawl arm is provided with a roller 29 in operative engagement with a cam 30 secured to a transverse shaft 31. The shaft 31 also has secured thereto a gear 32 meshing with a pinion 33 on the driven shaft 15. It will therefore be seen that the pawl and ratchet will move the conveyor 19 one step with each rotation of the cam 30, and this cam is synchronized with the sealing conveyor whereby the filling conveyor moves one short step while the sealing conveyor brings three empty chairs into alignment with the three filled cartons. The filling conveyor 19 is positioned directly back of suitable filling spouts 34 through which the material is forced into the empty cartons as they are positioned thereunder by the conveyor 19. The flights 20 extend forwardly and downwardly as shown in Figs. 5 and 6 whereby the cartons which are delivered therebetween are moved directly under the filling spouts. A horizontal shelf 35 (Fig. 5) is positioned under the downwardly extending ends of the flights 20 and is arranged to support the cartons between the flights after they are blown through the chutes 10.

Vertically movable plungers 36 have carton supporting heads 37 thereon and are positioned directly under the filling spouts 34. The plunger heads 37 are in alignment with the shelf 35 whereby the cartons, after they are received from the spouts between the flights 20, are moved by the next step of the conveyor 19 onto the heads of the plungers. The plungers 36 are mounted between rollers 38 which act as guides to maintain the plungers in alignment with the filling tubes during their vertical movement. A spring 39 is secured to the lower end of each of the plungers and is connected to the forwardly extending end of a lever 40. Each of the levers 40 is secured to a shaft 41 mounted in the rear of the machine as shown in Figs. 4 and 6. A cam arm 42 is also secured to the shaft 41 and provided with a roller 43 operating in a cam 44. The cam 44 is secured to a shaft 46 which is driven from the transverse shaft 31 by means of bevel gears 47.

The transverse shaft 31, as previously mentioned, is the driving cam shaft of the filler conveyor and moves the filler conveyor step by step. Therefore, the operation of the plungers 36 will be synchronized with the movement of the filler conveyor 19 in such a manner that the plungers 36 and the cartons thereon are raised and the cartons are thereby telescoped over the filling spouts and filled and packed and returned to their original position while the filling conveyor is stopped. As previously stated, the levers 40 for moving the plungers 36 are secured to these plungers by means of springs 39. Therefore, when the levers 40 are raised to the dotted line position shown in Fig. 4, the cartons on plungers 36 will be completely telescoped over the filling spouts.

During the filling of the cartons, they are pushed downwardly against the tension of the springs 39 by packing devices within the spouts 34 which will be described later. As soon as the cartons are completely filled, the filling motors are automatically stopped and the levers 40 move downwardly to their normal position shown in full lines in Fig. 4, and during this downward movement, the outer ends of the levers 40 engage pins 48 on the plungers 36 and the plungers are thereby moved downwardly into alignment with the shelf 35 whereby the cartons may be moved by the conveyor flights 20 to their next step position and new cartons may be moved onto the plungers 36.

As previously stated, the cartons are moved two steps by the filling conveyor; that is, they are received from the chutes 10 at station A (Figs. 5 and 6) on the shelf 35 and between the flights 20 of the conveyor chain. The conveyor chain then moves the carton onto the head 37 of plunger 36 at station B under the filling spout. The plunger 36 is then raised, thereby telescoping the carton over the filling spout 34 and the carton is filled and moved downwardly to its original position. It is then moved a second step to station C where it is in a position to be returned to the sealing conveyor by means which will now be described.

In order to return the cartons from the filling conveyor to the chairs of the sealing conveyor, laterally movable plungers 49 are pivoted to the ends of upright levers 50 and 51 and arranged for substantially horizontal movement. The levers 50 are pivoted on the frame at 52 (Fig. 4) and the levers 51 are secured to an oscillatable shaft 53 mounted at the rear of the machine. A cam arm 54 (Figs. 4 and 6) is also secured to the shaft 53 and provided with a suitable roller engaging a cam 55 whereby, with each rotation of the cam 55, the plungers 49 are moved forwardly to transfer the filled cartons from the shelf 35 to the chairs 7 of the sealing conveyor, this operation, of course, taking place while the filling conveyor is stopped and when the cartons are at station C.

It will be apparent that three empty cartons may be received simultaneously from the carton chutes 10 at stations A. These three empty cartons are moved simultaneously to stations B under the filling spouts where they are filled. The filled cartons are then simultaneously moved to stations C and are then all simultaneously transferred to the three aligned chairs 7, thereby keeping the sealing conveyor chairs constantly filled with filled cartons passing through the sealing mechanism 8.

The machine is provided with a handle 56 which is suitably connected for controlling a clutch 57 (Fig. 2) on the main drive shaft 14 of the sealer. This clutch provides for manually starting and stopping the mechanism when desired after the main driving motor 9 has been started by means of a suitable switch. All of the operations after the machine is started are automatic. Mechanism is also provided whereby the entire machine is automatically stopped when the material in the fillers is exhausted or if a carton is improperly filled. This automatic mechanism will be described later.

In order to blow the empty cartons from the stands 6, these stands are formed with a passage therethrough and suitable nozzles 58 are positioned directly under the chutes 10. The nozzles 58 are all connected to a suitable air pressure source by means of a conduit 59 (Figs. 1 and 4) having a valve 60 therein. The valve 60 is automatically opened when each set of three empty cartons on the conveyor stands arrive underneath the spouts 10, and in order to open the valve valve 60, a cam 61 is secured to the shaft 46 and engages a roller 62 on a downwardly extending lever 63 which is mounted for oscillation on the shaft 53. The lever 63 at the rear of the machine is connected to a similar lever 64 adjacent the valve 60 and pivoted at 65. The levers 63 and 64 are connected by means of a link 66. Therefore, during each revolution of the shaft 46, the cam 61, operating on the roller 62 and through the lever and link connection just described, opens the valve 60 by pressure of the lever 64 on the valve stem, thereby causing the cartons to be blown through the chutes 10 and onto the filling conveyor shelf 35.

One of the fillers is illustrated in transverse section in Fig. 7 and comprises a main hopper 67 for holding a supply of material to be packed. This hopper 67 communicates with individual hoppers 68 which direct the material to the filling spouts 34. An agitator shaft 69 is mounted in the main hopper 67 and extends over the open upper ends of all of the individual hoppers 68 and is provided with outwardly extending agitator arms 70. The shaft 69 extends through the wall of the hopper and is provided with a pulley 71 which is constantly driven from a pulley 72 on the shaft 46 by means of a belt 73. This device provides a continuously moving agitator which prevents clogging of the material in the hopper 67 and maintains the hopper 68 constantly filled.

A filling motor 74 is mounted above the hopper 68 and provided with a downwardly extending shaft 75 driven by means of speed reduction gearing 75a and having a suitable filling and packing auger 76 secured thereto and extending into the spout 34. The motor 74 also drives an auxiliary shaft 77 having a pinion 78 thereon, the shaft being driven from shaft 75 by means of gears 77a. The pinion 78 is in mesh with a gear 79 on a sleeve 80 surrounding the motor shaft 75. The lower end of the sleeve 80 is provided with an agitator comprising a strap 81 having downwardly extending arms 82 which substantially conform to the contour of the lower end of the hopper 68. This agitator provides a uniform feed of the material to the auger which, in turn, packs the material in the cartons and simultaneously pushes the plungers 37 and the cartons thereon downwardly during the process of filling. The motors 74 are normally stopped so that no material is being fed through the spouts 34 except when cartons are properly positioned thereunder.

The operation of each motor 74 is controlled by the positioning of a carton on the head 37 of the plungers 36 and by the upward movement of the plunger; that is, the positioning of a carton on the plunger head under the spout moves a trip member thereon to a position whereby, when the plunger rises to completely telescope a carton over the spout 34, the trip member engages and closes a switch which starts the motor. The downward movement of the plunger during the filling operation causes a lug thereon to engage and open the switch whereby the motor is stopped when the carton is completely filled. The motor remains stopped until a new carton is supplied.

Figure 9:
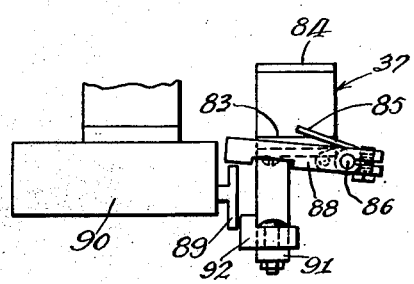
Fig. 9 is a transverse sectional view through the filler spout illustrated in Fig. 8, and also is a top view of the carton controlled switching means.
Figure 8:
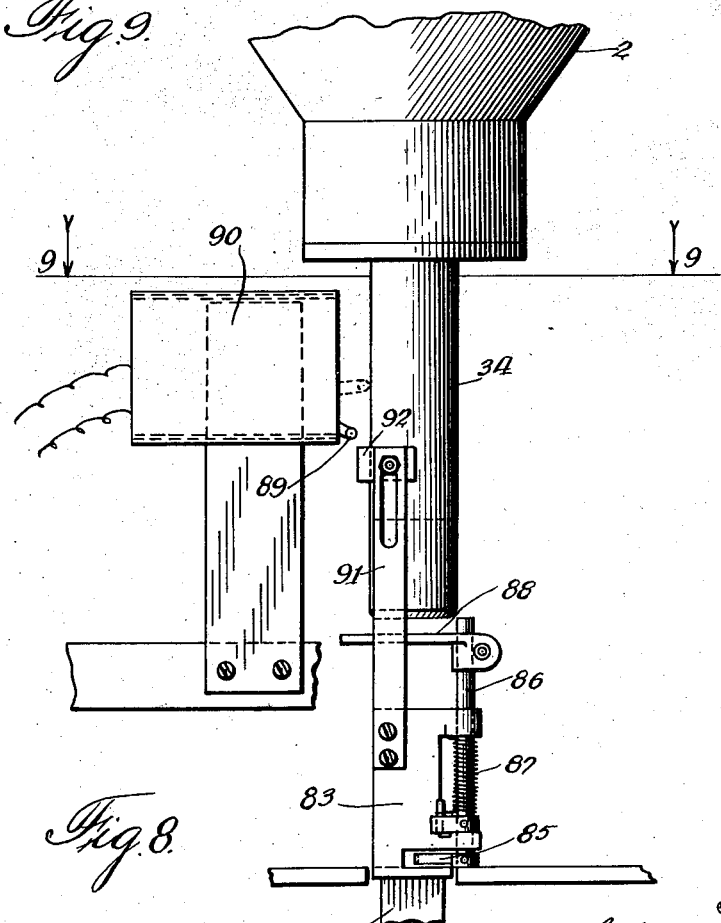
Fig. 8 is a front elevation of the electrical filler and packer control whereby the filler is prevented from functioning unless a carton is positioned thereunder.

In order to accomplish the above result, the carton supporting head 37 of the plunger is provided with upwardly extending flanges 83 and 84 (Figs. 8 and 9) to receive the carton therebetween. As the empty carton is moved between these flanges it engages and moves outwardly an arm 85 which is secured to an oscillatable shaft 86. This shaft is provided with a spring 87 which normally maintains the arm 85 in the path of the incoming carton. The shaft 86 is provided adjacent its upper end with an arm 88 which is normally out of alignment with a switch arm 89 of a switch 90, which latter is mounted adjacent the spout 34. Therefore, when a carton is moved onto the plunger head 37, the carton engages the trip 85 and, through the shaft 86, moves the upper arm 88 outwardly and into a position to engage the switch arm 89 and thereby close the filling motor switch 90 when the carton telescopes the spout, thereby starting the filling motor.

In order to move the switch arm 89 in the opposite direction to stop the motor when the carton is sufficiently filled, an extension 91 is secured to the plunger head and provided with an outwardly extending lug 92. This lug 92 is positioned so that during the normal upward movement of the plunger it will not engage the switch arm 89. However, after the plunger has been raised sufficiently to trip the switch arm to the position shown in dotted lines in Fig. 8, the lug 92 is considerably above the switch arm and the switch arm is then in the path of the lug in its downward movement. Therefore, as the plunger is forced downwardly during filling of the carton, the lug 92 will engage the switch arm 89 and operate the switch to stop the motor. The lug 92 is vertically adjustable on the extension 91 so that it may be adjusted to determine the point of cut-off of the motor and thereby determine the amount of material packed in the cartons.

Fig. 10 is a diagrammatic view of the automatic electrical control system whereby the filling motors operate only when a carton is in position to be filled, and whereby the main driving motor 9 will be automatically stopped in the event that insufficient material is supplied by the filling mechanism to properly fill a carton. In order to accomplish the automatic electrical control of the entire mechanism, each of the motors 74 is provided with a solenoid operated 4-pole contactor 93 having three poles normally open and one pole normally closed, as illustrated. These contactors are preferably two-wire common control 220 volts, 3 phase, 60 cycle, and are of a common commercial type and are directly connected to the power source and to the motors in the usual manner. The contactors for making and breaking the poles indicated are mounted on an armature 94 which is movable by means of a solenoid 95 to break the closed contacts illustrated and simultaneously close the open contacts, whereby the filling motors are started. The main driving motor 9 is provided with a similar contactor 96. However, this contactor is a three-pole contactor with normally open contacts. During operation of the machine, the contactor 96 for the main motor 9 is normally closed and the power current enters the motor in the usual manner and passes through a conductor 97, solenoid 98, and conductor 99, then through a normally closed switch 100 which is connected in the circuit by a conductor 101. Therefore, as long as the switch 100 is maintained closed, the motor 9 will continue to operate. However, the switch 100 is intermittently opened by means of a cam 102 on the cam shaft 46 of the filling control mechanism previously described. This cam 102 is engaged by a roller 103 on the switch arm 104. Therefore, with each revolution of the cam shaft 46, the switch 100 will be momentarily opened. In order to prevent the stopping of the motor 9 when the switch 100 is momentarily opened, the normally closed contacts 105 of the filling motor contactors 93 are all in series in a circuit 106 shunted around the switch 100. Therefore, as long as the contactors 93 are in the downward position illustrated, the motor 9 will continue to run even though the switch 100 is open. The motors 74 and the solenoids 95 are energized through conductors 107 which are connected to the switch 90 previously described and the operation of which, for starting and stopping the motors 74, is controlled by the cartons and vertical movement of the plungers.

As long as the contractors 93 are in the position illustrated, the shunt circuit 106 will be closed and the opening of the switch 100 will have no affect on the main driving motor 9. However, during the filling operation, the circuit 106 will be broken due to the raising of the armatures 94 of the contactors 93, and if one or more of the cartons fails to properly fill and push the plunger down sufficiently to open the switch 90 and break the circuit 107 and again close the shunt circuit 106, the opening of the switch 100 by the cam 102 will stop the main driving motor 9 and thereby stop the operation of the entire machine. It will be understood, of course, that during normal continuous operation of the machine the cartons are properly filled during the comparatively long interval in which the switch 100 remains closed, and, therefore, the main driving motor circuit will remain closed and the machine will continue to function.

Figure 11 is a somewhat diagrammatic end view of a modified form of the filler mechanism with a portion of the sealer conveyor adjacent thereto shown in section. The view is taken looking in the same direction as in Fig. 4. In this embodiment the axial line of the filler spout is on the opposite side of the path of the chairs from that illustrated in Fig. 4; that is, the axial line of the filler is inside of the path of the conveyor chairs instead of outside, and the carton chutes 10$^a$ are somewhat shorter whereby the empty cartons are delivered to a desired position inside the path of travel of the chairs 7 instead of outside. In this form the filler conveyor 19 is dispensed with and the cartons are delivered directly to a fixed shelf 108 and in traverse alignment with the axial line of the filler spouts 34. The plunger 36$^a$ is provided with a carton supporting head 37$^a$ which latter is somewhat similar to the head of the mechanism previously described and the surface of which is in alignment with the upper surface of the shelf 108 when the plunger is in its lowered position. The plunger 36$^a$ is aligned with the filler spout 34 by means of guide rollers 38$^a$ and is vertically movable in the same manner as the plunger 36 previously described.

The mechanism for operating the plunger 36$^a$ comprises a guide member 109 which may be secured in any suitable manner to the frame of the sealer conveyor and which may also support the shelf 108. A slide 110 is mounted for vertical movement on the guide 109 and its upper end is provided with an outwardly extending lug 111 for engagement with a pin 48$^a$ on the plunger 36$^a$. The lug 111 and the pin 48$^a$ cooperate to limit the upward movement of the plunger 36$^a$ and also to properly align the upper surface of the plunger head 37$^a$ with the surface of the shelf 108 when the plunger is in its lowered position. This cooperation of the lugs in lowered position is illustrated by dotted lines. A spring 39$^a$ is connected to the upper end of the slide member 110 and to the lower end of the plunger 36$^a$ and the tension of this spring is adjustable by means of a screw 112 and thumb nut 113. The slide 110 is connected to a crank disk 114 by means of a connecting rod 115 whereby the rotation of the crank will raise and lower the carton. The crank pin is preferably adjustable on the disk in the usual manner.

The crank disk 114 forms the intermittently driven member of a clutch 16 having a driving member 117 secured to a suitable shaft 118 which latter may be constantly driven from the shaft 31 or any other suitable power source, on the sealer transmission and through a suitable speed reducing mechanism which may be similar to that shown in Fig. 6. The clutch 116 may be of any of the usual types having oppositely disposed dog arms or lugs 119 whereby the clutch is out of engagement when either of the lugs engages a bell crank detent 120. The detent 120 may be moved to release the dog 119 and permit a one-half revolution of the engaged clutch, by means of a suitable cam 121 which may be driven from any suitable power source. It will be apparent that with each one-half revolution of the engaged clutch 116, the plunger 36$^a$ will be raised to telescope an empty carton over the filling spout 34 in the same manner as previously described, and this operation may be synchronized with the movement of the sealing conveyors whereby the various operations may be properly timed.

A horizontally movable plunger 122 is provided with a head 123 having a rearwardly extending shelf portion 124. The plunger 122 is intermittently movable underneath the carton delivery chute 10$^a$ and may be operated from the sealer transmission by a cam and lever arrangement somewhat similar to the mechanism previously described and illustrated in Fig. 4.

It will be understood that each of the filling devices is provided with a similar mechanism and the operation of each mechanism is substantially as follows:

When the parts are in the position illustrated in Fig. 11, an empty carton is delivered on the shelf 108 and adjacent the plunger face 123 in the position illustrated by full lines. The plunger 122 then operates while the plunger 36ª is in its lowered position, to push the empty carton under the filler spout 34 as indicated in dotted lines. The filler plunger 36ª is then raised by the operation of the slide 110 and associated mechanism to telescope the carton over the filler spout 34. During the time that the raised carton is being filled and returned to its lowered position, another empty carton is delivered to the shelf 108, and after the filled carton is completely lowered, the plunger 122 pushes the newly delivered empty carton onto the plunger 37ª and in a position to be filled, and simultaneously the empty carton pushes the filled carton from under the filler spout and onto one of the chairs 7 which is then in a position to receive it. These operations are continually repeated and all of the mechanism is so synchronized that the delivery of the filled cartons to the chairs 7 will take place when the chairs 7 are substantially in alignment with the plunger head 37ª.

The mechanism of the device as illustrated in Fig. 11 is in some ways preferable to that previously described in that considerable mechanism may be dispensed with and fewer movements of the cartons are required. It will be understood that the electrical control system may be similar to that previously described.

While the sealing conveyors have been described as being arranged for continuous movement, it will be apparent that they may be moved intermittently, if desired, in which case the various operations of the filling and transfer mechanism, whereby the cartons are transferred from the filling device to the sealing conveyor, will be properly synchronized. In order to move the sealing conveyors intermittently, it is only necessary to provide a suitable automatically operable clutch in the sealer transmission and this clutch may be similar to that illustrated in Figs. 2, 3, and 4 of Patent No. 1,967,374 issued July 24, 1934.

The containers have been termed "cartons" throughout the specification and claims, and the embodiment herein illustrated and described is adapted for filling and sealing the usual rectangular cartons. It will be understood, however, that any suitable container may be used.

Modifications may be made in the embodiments herein illustrated and described and it is desired, therefore, that the invention be limited only by the prior art and the scope of the appended claims.

Having thus described this invention what is claimed and desired to be secured by Letters Patent is:

1. The combination with a sealing mechanism having a conveyor for delivering cartons thereto, of a support for empty cartons, means for moving consecutive empty cartons from said support to said conveyor, means intermediate said support and said conveyor for filling said cartons, means controlled by said cartons for automatically starting the filling operation, and means for stopping said filling means when each carton is filled.

2. The combination with a sealing mechanism having a conveyor for delivering cartons thereto, of a support for empty cartons, means for moving consecutive empty cartons from said support to said conveyor, means intermediate said support and said conveyor for filling said cartons, and means for automatically stopping the sealing mechanism if the filling means fails to properly fill a carton.

3. In an automatic carton filler and sealer, the combination with a carton sealer having two sets of carton carriers for bringing cartons into operative relation with a sealing mechanism, of means for substantially simultaneously moving a series of consecutive cartons from one set of carriers to the other by a series of intermittent steps, and means for simultaneously filling said cartons at one of said steps.

4. In an automatic carton filler and sealer, the combination with a carton sealer having two sets of carton carriers for bringing cartons into operative relation with a sealing mechanism, of means for substantially simultaneously moving a plurality of consecutive cartons from one set of carriers to the other by a series of intermittent steps, a corresponding plurality of filler spouts, and means adjacent each spout and simultaneously operable at one of said steps for telescoping said plurality of cartons over corresponding filling spouts.

5. In an automatic carton filler and sealer, the combination with a carton sealer having two sets of carton carriers for bringing cartons into operative relation with a sealing mechanism, of means synchronized with said carriers for moving a plurality of consecutively positioned cartons from one set of carriers to the other by a series of substantially simultaneous intermittent steps, a filler spout for each carton, means at one of said steps for telescoping each carton over a corresponding filling spout, and means associated with each filler spout for delivering and packing a predetermined volume of material into each of said cartons.

6. A carton filler and sealer comprising a sealing mechanism, two sets of individual carton carriers for bringing the cartons into operative relation with said mechanism, means for causing the carriers to travel in separate paths while bringing the cartons into said operative relation in the same path for sealing, a filling carrier adjacent the path of one set of carriers and movable longitudinally therewith, means for simultaneously transferring a consecutive series of empty cartons from one of said sets of carriers to said filling carrier for intermittent movement thereby, means for filling said cartons during said intermittent movement, and means for simultaneously transferring said filled cartons to the other set of carriers for consecutive movement to the sealing mechanism.

7. A carton filler and sealer comprising a sealing mechanism, two sets of carton carriers for bringing the cartons into operative relation with said mechanism, means for causing the carriers to travel in separate paths while bringing the cartons into said operative relation and in the same path for sealing, a filling carrier movable parallel with the path of one set of carriers, means for transferring consecutive pluralities of empty cartons from one of said sets of carriers to said filling carrier for intermittent movement thereby, means for simultaneously filling said cartons during said intermittent movement, and means for simultaneously transferring said filled cartons to the other set of carriers for consecutive movement to the sealing mechanism.

8. A carton filler comprising a hopper having a downwardly extending filling spout with an automatically operable filling and packing auger therein, means for positioning a carton adjacent said spout, means for moving said carton under said spout, means controlled by said carton for starting said filler and packer, means for telescoping said carton over said filling spout, said packer being adapted to push said carton downwardly during filling, and means for stopping said filler when said carton is filled, said telescoping means being adapted to continue the downward movement of said carton to normal position under said spout, said carton moving means being adapted to move said filled carton from under said spout and simultaneously position another empty carton thereunder.

9. A device of the character described comprising a sealer arranged to seal the tops of empty cartons and filled cartons, a plurality of fillers, means for simultaneously delivering and inverting a plurality of empty cartons in a group from said sealer to a corresponding plurality of fillers, and means for simultaneously returning said plurality of cartons to said sealer after the filling operation is completed.

10. A device of the character described comprising a sealer arranged to seal empty cartons and filled cartons, a plurality of fillers, means for delivering consecutive empty cartons in a group from said sealer to said fillers, automatically controlled means to operate said fillers, and means to return said groups of filled cartons to said sealer.

11. A device of the character described comprising a sealer arranged to seal empty cartons and filled cartons, a plurality of fillers, means for delivering consecutive empty cartons in a group from said sealer to said fillers, means controlled by each empty carton of a group to automatically fill said carton, and means to return said groups of filled cartons to said sealer.

12. A carton sealer and filler comprising a sealing mechanism having a plurality of horizontally movable sealer conveyors having spaced carton supports thereon, a series of filler mechanisms having filling spouts closely adjacent one of said conveyors and spaced equally with said supports, means for transferring consecutive sets of empty cartons from the other conveyor to supports adjacent corresponding filler spouts, means for moving said cartons under said filler spouts and onto said first sealer conveyor carton supports, means controlled by individual cartons for starting corresponding fillers, means to elevate and lower said cartons while under said spouts to telescope said spouts, means controlled by the downward movement of said elevators to stop said fillers, all of said means being synchronized for continual operation to fill and seal consecutive sets of cartons, and laterally movable means adjacent each filler and spaced equally with said carton supports to move each set of filled cartons on to corresponding carton supports as they move into alignment therewith.

13. The combination with a sealing mechanism having a conveyor for delivering cartons thereto, of a support for empty cartons, means for moving consecutive empty cartons from said support to said conveyor, means intermediate said support and said conveyor for filling said cartons, and means for stopping said carton moving means if the filling means fails properly to fill a carton.

14. The combination with a sealing mechanism having a conveyor for delivering cartons thereto, of a support for empty cartons, means for moving consecutive empty cartons from said support to said conveyor, means intermediate said support and said conveyor for filling said cartons, means controlled by said cartons for starting said filling means, and means for stopping said carton moving means if the filling means fails properly to fill a carton.

15. An automatic carton filling machine comprising a plurality of individual motor driven fillers, a motor driven means for continually delivering empty cartons thereto and removing filled cartons therefrom, means for telescoping each carton over a corresponding filler and constructed and arranged to enable movement therefrom during the filling operation, means for starting each filling motor when a corresponding carton is properly positioned for filling, a control circuit for the motor of said delivering and removing means, means for intermittently breaking said circuit, a normally closed shunt circuit associated with said fillers to normally maintain said breaking means ineffective, and means to make said shunt circuit ineffective if one or more of said filling means fails properly to fill a carton.

16. In a carton sealing and filling machine the combination with a sealing mechanism having two sets of carton carriers traveling in separate paths to receive cartons and in the same path while the cartons are being sealed, of a carton filler closely adjacent the carrier in one of said separate paths, means for inverting and conveying empty cartons from the carrier in the other separate path to a position closely adjacent said filler, means for moving consecutively positioned cartons to a filling position, means controlled by said cartons to start said filler, means to move filled containers to the carrier in said adjacent separate path, and means to prevent movement of a partly filled carton to said last-mentioned carrier.

17. In an automatic machine of the character described having a first conveyor for moving squared out empty cartons consecutively from a sealing mechanism and a second conveyor for consecutively moving filled cartons to said sealing mechanism, a plurality of filling devices, means for substantially simultaneously moving consecutive empty cartons in a group to a corresponding series of filling stations, means for substantially simultaneously filling said group of cartons, and means for substantially simultaneously moving said group of filled cartons to said second conveyor for consecutive sealing.

18. In a machine of the character described having a closing mechanism, and carton conveying means comprising a pair of horizontally disposed endless closing conveyors, the paths of travel of said conveyors coinciding while passing cartons through said closing mechanism, a third conveyor movable parallel with one of said closing conveyors, means for moving empty cartons from the other of said closing conveyors to said parallel conveyor, means for filling said cartons, and means for moving said filled cartons to said adjacent closing conveyor.

19. In a machine of the character described having a closing mechanism, and carton conveying means comprising a pair of horizontally disposed endless closing conveyors, the paths of travel of said conveyors coinciding while passing cartons through said closing mechanism, a third conveyor movable parallel with one of said closing conveyors, means for moving empty cartons from the other of said closing conveyors to said parallel conveyor, means for filling said cartons, a resiliently supported elevator for raising said cartons for filling and constructed to be pushed downwardly by pressure of the filler against the material in said cartons during filling, means to limit the amount of material inserted in each carton, means to positively lower said elevator after filling to normal position for movement by said parallel conveyor, and means to move said filled cartons to said adjacent closing conveyor.

20. An automatic carton filling machine comprising a plurality of individually operable fillers, motor driven means for delivering empty cartons to said fillers and removing filled cartons therefrom, a control circuit for said motor driven means, intermittently operated interrupting means in said control circuit, a shunt circuit for normally maintaining said interrupting means ineffective, and means associated with said fillers for opening said shunt circuit upon improper operation of any one of said fillers, whereby said interrupting means is rendered effective to stop said motor driven delivery and removal means.

21. An automatic carton filling machine comprising a plurality of individually operable fillers, motor driven means for delivering empty cartons to said fillers and removing filled cartons therefrom, a control circuit for said motor driven means, intermittently operated interrupting means in said control circuit, and means associated with said fillers for normally shunting said interrupting means whereby said interrupting means is rendered ineffective to control said motor driven means, said shunting means being operable upon improper operation of said fillers to render said interrupting means effective to stop said motor driven delivery and removal means.

22. An automatic carton filling machine comprising a plurality of individual motor driven fillers, motor driven means for delivering empty cartons to said fillers and removing filled cartons therefrom, means controlled by the empty cartons for starting each filling motor when a corresponding carton is properly positioned for filling, a control circuit for said motor driven means, intermittently operated interrupting means in said circuit, a shunt circuit controlled in accordance with the energization of said filler motors for normally maintaining said interrupter means ineffective, and means responsive to improper operation of said fillers for interrupting said shunt circuit whereby said intermittently operated interrupting means becomes effective to stop said motor driven delivery and removal means.

23. An automatic carton filling machine comprising a plurality of individual motor driven fillers, individual switch means for controlling the filler motors, motor driven means for delivering empty cartons to said fillers and removing filled cartons therefrom, means controlled by the empty cartons for effecting closure of said switch means to start said filler motors when a corresponding carton is in filling position, a control circuit for said motor driven means including an intermittently operable interrupter, and means associated with said switch means for shunting said interrupter to render said interrupter ineffective during proper operation of said fillers, said last mentioned means being arranged to render said interrupter effective to stop said motor driven delivery and removal means upon improper operation of any of said fillers.

JOHN L. FERGUSON.